US008564795B2

(12) United States Patent
Yazawa et al.

(10) Patent No.: US 8,564,795 B2
(45) Date of Patent: Oct. 22, 2013

(54) PRINTER CAPABLE OF PREVENTING PAPER JAM

(75) Inventors: Shou Yazawa, Kawasaki (JP); Yukio Yoshioka, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/634,833

(22) PCT Filed: Feb. 24, 2011

(86) PCT No.: PCT/JP2011/054822
§ 371 (c)(1),
(2), (4) Date: Sep. 13, 2012

(87) PCT Pub. No.: WO2012/029337
PCT Pub. Date: Mar. 8, 2012

(65) Prior Publication Data

US 2013/0010315 A1 Jan. 10, 2013

(30) Foreign Application Priority Data

Aug. 30, 2010 (JP) ................................ 2010-191657

(51) Int. Cl.
*G06K 15/00* (2006.01)

(52) U.S. Cl.
USPC .......... 358/1.12; 400/582; 400/578; 400/593; 400/56; 400/605; 400/611; 101/228; 101/219; 101/216; 101/92; 101/91; 399/395; 399/394; 399/388; 399/381; 226/28; 226/27; 226/24

(58) Field of Classification Search
None
See application file for complete search history.

(56) References Cited

U.S. PATENT DOCUMENTS

| | | | | |
|---|---|---|---|---|
| 4,429,985 | A * | 2/1984 | Yokota | 399/165 |
| 5,219,234 | A * | 6/1993 | Sakai | 400/120.16 |
| 5,347,348 | A * | 9/1994 | Nagata | 399/329 |
| 5,478,161 | A * | 12/1995 | Suzuki et al. | 400/582 |
| 6,164,201 | A * | 12/2000 | Burke | 101/228 |
| 6,918,709 | B2 | 7/2005 | Takeuchi et al. | |
| 2004/0183850 | A1 | 9/2004 | Takeuchi et al. | |
| 2009/0245912 | A1 | 10/2009 | Igarashi et al. | |

FOREIGN PATENT DOCUMENTS

| | | | |
|---|---|---|---|
| CN | 1519130 | A | 8/2004 |
| JP | 55-132045 | U | 9/1980 |
| JP | 59-155082 | A | 9/1984 |
| JP | 3-111875 | A | 5/1991 |
| JP | 7-144806 | A | 6/1995 |
| JP | 11-208048 | A | 8/1999 |
| JP | 2010-105764 | A | 5/2010 |

OTHER PUBLICATIONS

Machine translation of Tanizawa et al., Japanese Pat. Pub. 2010-0105764, published May 13, 2010.*
International Search Report of PCT/JP2011/054822 dated Apr. 12, 2011.
Japanese Office Action of JP 2010-191657 dated Apr. 6, 2011.
Office Action dated Jun. 4, 2013 issued by the State Intellectual Property Office of P.R. China in corresponding Chinese Patent Application No. 201180014202.6.

* cited by examiner

*Primary Examiner* — Benny Q. Tieu
*Assistant Examiner* — Paul F Payer
(74) *Attorney, Agent, or Firm* — Sughrue Mion, PLLC

(57) ABSTRACT

Disclosed is a printer including a transverse tension sensor for detecting that a sheet being discharged has deviated in a paper width direction orthogonal to a discharging direction. The conveyance of the sheet is stopped based on a detection signal of the transverse tension sensor.

8 Claims, 7 Drawing Sheets

PRINTER CAPABLE OF PREVENTING PAPER JAM

CROSS REFERENCE TO RELATED APPLICATIONS

This application is a National Stage of International Application No. PCT/JP2011/054822 filed Feb. 24, 2011, claiming priority based on Japanese Patent Application No. 2010-191657 filed Aug. 30, 2010, the contents of all of which are incorporated herein by reference in their entirety.

TECHNICAL FIELD

This invention relates to a printer for performing printing on a roll paper sheet.

BACKGROUND ART

Referring to FIGS. 1A and 1B, in this type of printer, when a printed sheet (roll paper) S is being discharged in a discharging direction F, if an obstacle such as a user's hand is placed in front of a discharge port 13 to interrupt the discharge of the sheet S, as illustrated in FIG. 1B, the sheet S may be rolled around a conveyance roller 14 for conveying the sheet in an inner part of the printer, that is, in a sheet conveyance path between a lower frame 11 and an upper frame 12, with the result that paper jam may occur.

As a countermeasure for preventing the paper jam, a sheet discharge device configured as illustrated in FIG. 1C is known. Referring to FIG. 1C, in this printer, a retreat region for the sheet S is formed so as to communicate to the sheet conveyance path, and a deflection sensor 16 for detecting the sheet S that has deflected to enter the retreat region is provided. Based on a detection signal of the deflection sensor 16, the rotation of the conveyance roller 14 is controlled and stopped, to thereby urgently stop the discharge operation of the sheet S. After that, the obstacle in front of the discharge port 13 is removed, and the printer is operated again.

By the way, the paper jam occurs also when the discharging direction of the sheet (the same direction as the conveyance direction) has deviated in a paper width direction, as well as when the discharge of the sheet has been hindered by an obstacle as described above. For example, in a printer illustrated in FIGS. 2A to 2C, when the sheet S is being discharged as illustrated in FIG. 2B (at a stage where a trailing edge of the sheet S in the discharging direction is in contact with the conveyance roller), if the sheet S is pulled by a user as illustrated in FIG. 2C to deviate in a paper width direction W orthogonal to the discharging direction F (this state is referred to also as being subjected to transverse tension) and if the conveyance roller continues rotating under the state where the sheet S deviates in the paper width direction W, the sheet S is rolled around the conveyance roller to cause paper jam.

Note that, when the sheet is subjected to the transverse tension, unlike when an obstacle is present in front of the discharge port, no deflection or only a little deflection occurs in the sheet in the sheet conveyance path. The conveyance of the sheet S is therefore not stopped even by the configuration illustrated in FIG. 1C using the deflection sensor, and paper jam occurs as illustrated in FIG. 1D. In other words, the configuration illustrated in FIG. 1C cannot reliably prevent the paper jam caused by the transverse tension of the sheet.

As a countermeasure for preventing the paper jam caused by the transverse tension of the sheet, there is known a technology in which guide means for restricting the deviation of the sheet in the paper width direction are provided in the vicinity of the discharge port for the sheet. For example, in the printer illustrated in FIGS. 2A to 2C, as illustrated in FIG. 2A, a pair of guide pieces 68 is formed to have an interval therebetween corresponding to a width dimension of the sheet S when the sheet S is discharged in a normal discharging direction F.

The printer including this type of guide means is, in addition to the one illustrated in FIGS. 2A to 2C, also disclosed in, for example, Related Art Document 1 (Japanese Unexamined Patent Application Publication (JP-A) No. Sho 59-155082) and Related Art Document 2 (Japanese Unexamined Patent Application Publication (JP-A) No. Hei 11-208048). It is found in the technology disclosed in Related Art Document 1 that a guide hole formed in a member called a guide has an opening dimension corresponding to a width dimension of the sheet and hence the sheet can be restricted from deviating in the paper width direction to some extent. It is also found in the technology disclosed in Related Art Document 2 that a guide wall formed on a guide member has an opposing dimension corresponding to a width dimension of roll paper and hence the roll paper can be restricted from deviating in the paper width direction to some extent.

However, the guide means in the example illustrated in FIGS. 2A to 2C and the examples disclosed in Related Art Documents 1 and 2 allow the sheet to deviate in the paper width direction because, when the sheet is subjected to transverse tension, the sheet deflects in the paper width direction as illustrated in FIG. 2C. In other words, in the example illustrated in FIGS. 2A to 2C and the examples disclosed in Related Art Documents 1 and 2, the paper jam caused by the transverse tension of the sheet cannot be prevented reliably.

DISCLOSURE OF THE INVENTION

It is therefore an object of this invention to provide a printer capable of reliably preventing paper jam caused by transverse tension of a sheet.

According to this invention, there is obtained a printer for conveying a sheet of a roll paper type in a conveyance direction (discharging direction) to perform printing thereon, the printer including a transverse tension sensor for detecting that the sheet being discharged has deviated in a paper width direction orthogonal to the discharging direction, in which conveyance of the sheet is stopped based on a detection signal of the transverse tension sensor.

The transverse tension sensor may include: a pair of movable pieces, each of which is displaced when the sheet has been displaced to one side and another side in the paper width direction; and a sensor portion for detecting displacement of the pair of movable pieces as a state where the sheet has deviated in the paper width direction.

The pair of movable pieces may include guide portions opposed to each other on an outer side in the paper width direction, the guide portions may be biased by bias means inward in the paper width direction so as to have an interval therebetween corresponding to a width dimension of the sheet, and the bias means may have a biasing force larger than a force of discharging the sheet.

The printer may further include a front cover mounted to a front surface of the printer in a removable manner so as to cover an inside of the printer, the front surface having a discharge port formed therein, and the pair of movable pieces and the sensor portion may be mounted on an inner side of the front cover.

The pair of movable pieces may be coupled together so as to move in association with each other, and the sensor portion may be provided in common to the pair of movable pieces.

The pair of movable pieces may be coupled together so as to move in association with each other, and the bias means may be provided in common to the pair of movable pieces.

The sensor portion may be any one of an optical sensor, a magnetic sensor, and a mechanical switch.

The bias means may be any one of a coil spring, a leaf spring, and a weight.

The printer may further include: a retreat region for the sheet, which is formed in a thickness direction of the sheet so as to communicate to a sheet conveyance path; and a deflection sensor provided in the retreat region, for detecting the sheet that has entered the retreat region when discharge has been hindered, and the conveyance of the sheet may be stopped based on the detection signal of the transverse tension sensor or a detection signal of the deflection sensor.

The printer may further include means for informing, when the conveyance of the sheet has been stopped, a user of the stop of the conveyance of the sheet.

BEST MODE FOR EMBODYING THE INVENTION

Figure 1A:
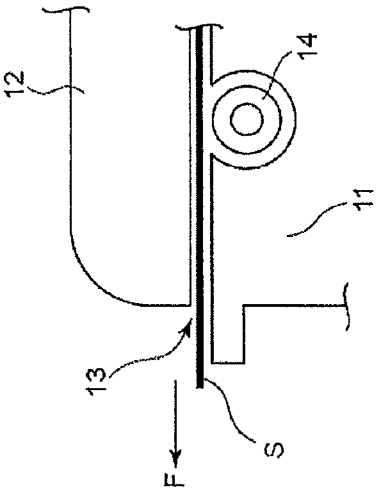
FIGS. 1A to 1D are schematic sectional views illustrating the configuration and operation of a printer according to the related art of this invention.
Figure 1B:
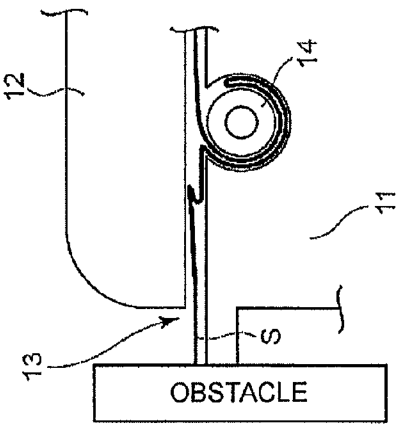
Figure 1C:
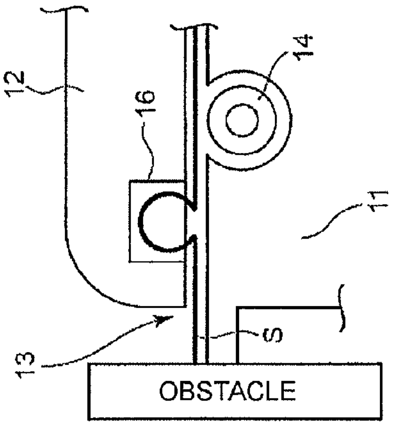
Figure 1D:
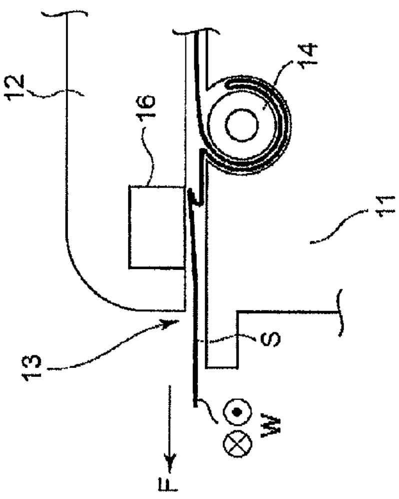
Figure 2A:
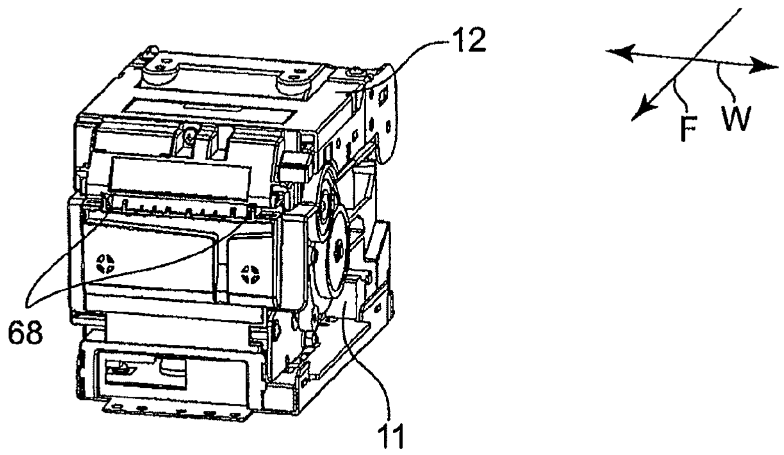
FIGS. 2A to 2C are perspective views illustrating the operation of a printer according to the related art of this invention.
Figure 2B:
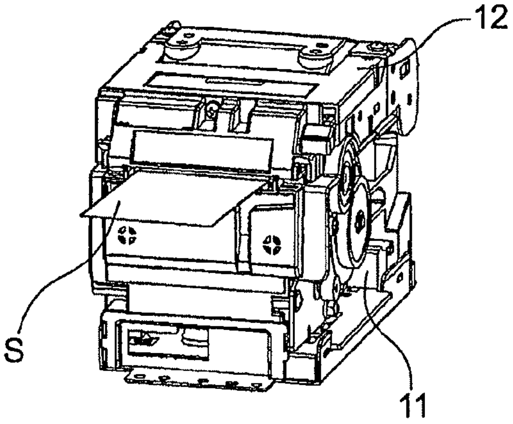
Figure 2C:
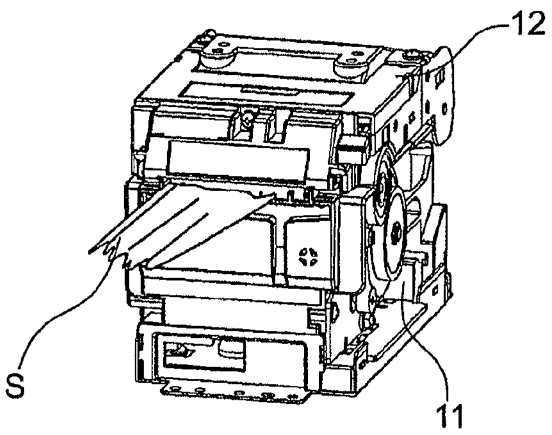

A printer according to this invention is a printer for performing printing on roll paper.

In particular, the printer according to this invention includes a transverse tension sensor for detecting that a sheet being discharged has deviated in a paper width direction orthogonal to a discharging direction, and the conveyance of the sheet is stopped based on a detection signal of the transverse tension sensor.

More specifically, the transverse tension sensor includes a pair of movable pieces, each of which is displaced when the sheet has been displaced to one side and another side in the paper width direction, and a sensor portion for detecting the displacement of the pair of movable pieces as a state where the sheet has deviated in the paper width direction.

With the above-mentioned configuration, the printer according to this invention stops the conveyance of the sheet at timing when the sheet is subjected to transverse tension, and is therefore capable of reliably preventing paper jam caused by the transverse tension of the sheet.

In the following plurality of embodiments, the same or similar portions to those in the related art illustrated in FIGS. 1A to 1D and FIGS. 2A to 2C are denoted by similar or identical reference symbols in the drawings, or their illustration and detailed description are omitted and the illustration and detailed description in the related art are employed as necessary.

Referring to the drawings, a printer according to embodiments of this invention is described below.

First Embodiment

Figure 3:
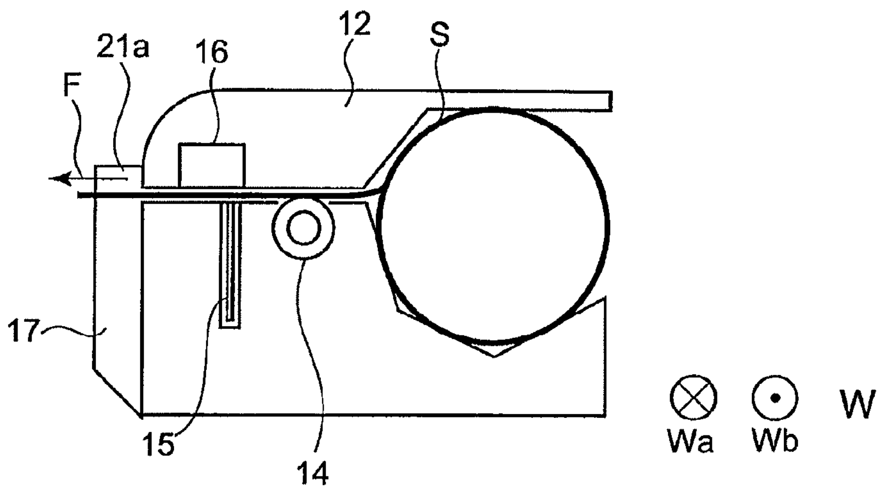
FIG. 3 is a schematic sectional view illustrating the configuration of a printer according to an embodiment of this invention.
Figure 4:
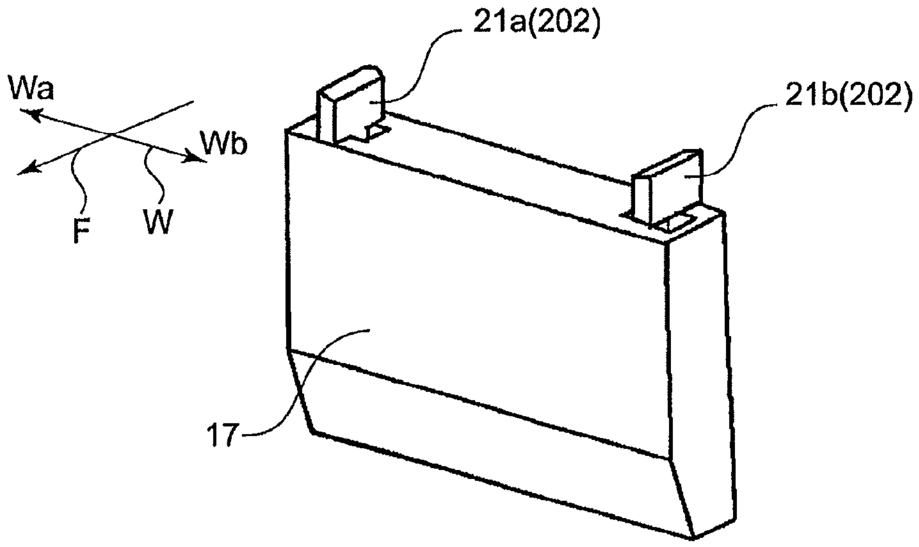
FIG. 4 is a perspective view illustrating a main part of a printer according to a first embodiment of this invention.

Referring to FIG. 3, a printer according to a first embodiment of this invention performs printing while conveying a sheet (roll paper) S and discharges the printed sheet S from a discharge port 13 in a discharging direction F (the same direction as the conveyance direction).

The printer in the first embodiment includes a lower frame 11 provided with a holder for the roll sheet S, an upper frame 12 mounted to the lower frame 11 in an openable and closable manner, a front cover 17 mounted to the lower frame 11 in a removable manner so as to cover the inside of the printer, print heads (not shown) provided sequentially in a sheet conveyance path between the sheet roll holder and the discharge port 13, a conveyance roller 14 for conveying the sheet S, and an automatic cutter 15 formed of a unit of a stationary blade and a movable blade for cutting the sheet S (only the movable blade is illustrated in FIG. 3).

The printer according to this invention includes a transverse tension sensor for detecting that the sheet S being discharged has deviated in a paper width direction W orthogonal to the discharging direction F, and the conveyance of the sheet is stopped based on a detection signal of the transverse tension sensor.

Further referring to FIG. 4 and FIGS. 5A to 5C, the transverse tension sensor includes a pair of movable pieces 21*a* and 21*b*, and an optical sensor 41 as a sensor portion. The pair of movable pieces 21*a* and 21*b* and the optical sensor 41 as the sensor portion are mounted on the inner side of the front cover 17 (on the side facing the inside of the printer). Note that, the front cover 17 is a part of a housing wall of the printer, which is opened for maintenance such as the elimination of biting of the automatic cutter 15 into the sheet S and the cleaning of paper dust (generated in the cutting) inside the printer. Accordingly, the inner side of the front cover 17 (the side facing the inside of the printer) may be exposed to the paper dust. Therefore, in the case where the movable pieces and the sensor portion of the transverse tension sensor are mounted on the inner side of the front cover 17, an anti-dust cover may be provided for protecting the movable pieces and the sensor portion from the paper dust so that the operation of the movable pieces and the function of the sensor portion may not be hindered. Further, an assembly obtained by mounting the movable pieces and the sensor portion of the transverse tension sensor onto the front cover 17 may be applied as being replaced with a front cover of an existing printer. In this case, wiring means for the detection signal from the sensor portion, which is described later, is set as appropriate.

Each of the movable pieces 21*a* and 21*b* has a substantially L-shape and is mounted on the inner side of the front cover 17 so as to be pivotable about a support 201. The movable piece 21*a* is displaced when the sheet S is displaced to one side (Wa) in the paper width direction W, while the movable piece 21*b* is displaced when the sheet S is displaced to the other side (Wb) in the paper width direction W. As described below, both the movable pieces are coupled together and therefore displaced in association with each other.

In the vicinity of one end of the L-shape of each of the movable pieces 21*a* and 21*b*, a slide shaft 204 formed of a combination of an elongated hole and a stud is provided to couple the movable pieces 21*a* and 21*b* together.

The other end of the L-shape of each of the movable pieces 21*a* and 21*b* protrudes from an elongated hole formed in the upper surface of the front cover 17, and forms a guide portion 202. Both the guide portions 202 are positioned so that, when the front cover 17 is mounted to the printer, the guide portions 202 may sandwich the discharged sheet S in the paper width direction W immediately ahead of the discharge port 13. At least the guide portion 202 of each of the movable pieces 21*a* and 21*b* is made of a material having low friction and has a finished surface.

At a coupling portion of the movable pieces 21*a* and 21*b*, a coil spring 31 serving as bias means for biasing the guide portions 202 of both the movable pieces inward in the paper width direction W is mounted in common to the movable pieces 21*a* and 21*b*. The coil spring 31 as the bias means biases the movable pieces 21*a* and 21*b* inward in the paper width direction W so that the guide portions 202 may have an interval therebetween corresponding to the width dimension of the sheet S. A biasing force of the coil spring 31 as the bias means is set to be larger than a force of discharging the sheet S by the conveyance roller 14. The sheet S discharged from the discharge port 13 in the discharging direction F is therefore restricted from deviating in the paper width direction W to some extent. Note that, the bias means is not limited to the coil spring but may be a leaf spring.

In addition, at one end of one of the movable pieces 21*a* and 21*b* (the movable piece 21*b* in this example), an extending portion 203 is formed so as to extend toward the optical sensor 41 as the sensor portion. The extending portion 203 of the movable piece 21*b* is displaced not only when the movable piece 21*b* is displaced but also when the movable piece 21*a* is displaced, because the movable pieces 21*a* and 21*b* are coupled together by the slide shaft 204.

The optical sensor 41 as the sensor portion includes a light source of detection light and a light receiving element which are opposed to each other. Based on whether or not the detection light is blocked by the extending portion 203 of the movable piece 21*b*, the optical sensor 41 detects the displacement of the movable pieces 21*a* and 21*b* as the state where the sheet S has deviated in the paper width direction W, that is, the sheet S has been subjected to transverse tension. The illustrated example represents a normal discharge state when the detection light is blocked and represents a state under transverse tension when the detection light passes.

Figure 5A:
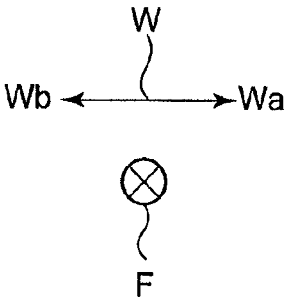
FIGS. 5A to 5C are schematic sectional views illustrating the configuration and operation of the main part of the printer according to the first embodiment of this invention.
Figure 5A:
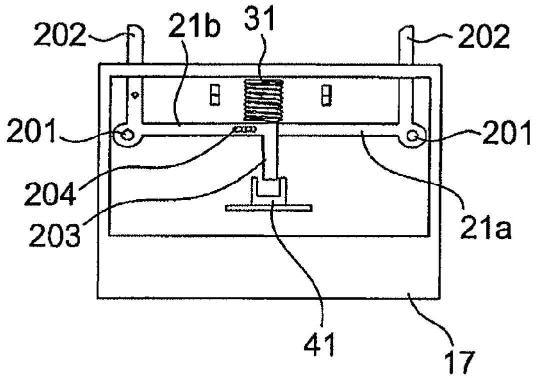
Figure 5B:
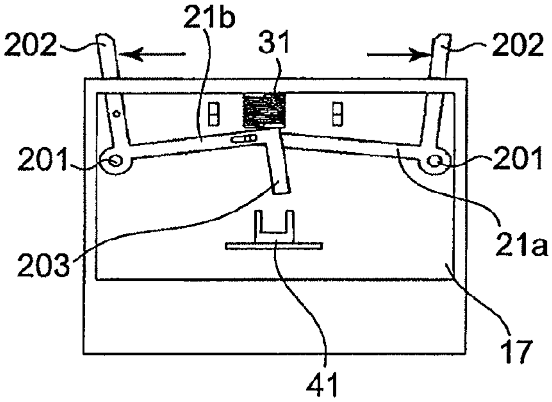
Figure 5C:
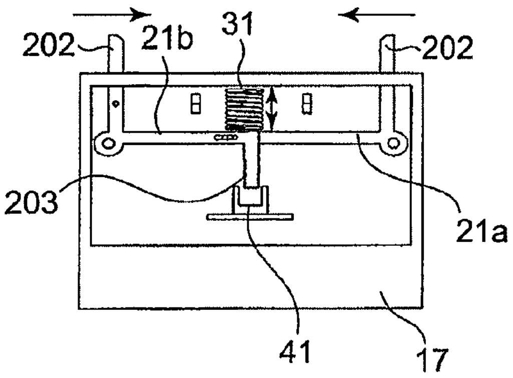

In this transverse tension sensor, when the sheet S is being discharged, if a user pulls the sheet S transversely with a force equal to or stronger than the biasing force of the coil spring 31 as the bias means, the guide portion of the movable piece on the side where the sheet is pulled is tilted outward in the paper width direction W, and, as illustrated in FIG. 5B, both the coupled movable pieces 21*a* and 21*b* are displaced and the extending portion 203 is displaced so as to be retreated from the optical sensor 41. When the detection light that has been blocked by the extending portion 203 passes, the optical sensor 41 as the sensor portion outputs a detection signal indicating that the sheet S has deviated in the paper width direction W, that is, the sheet S has been subjected to transverse tension. Then, based on the detection signal, the rotation of the conveyance roller 14 is stopped. Note that, in response to the detection signal indicating that the sheet S has been subjected to the transverse tension, a control portion (not shown) of the printer according to this invention stops the rotation of the conveyance roller 14.

As illustrated in FIG. 3, the printer according to this invention further includes a retreat region for the sheet, which is formed in a thickness direction of the sheet so as to communicate to the sheet conveyance path in front of the discharge port 13, and a deflection sensor 16 provided in the retreat region, for detecting the sheet S that has entered the retreat region when the discharge has been hindered. Note that, as the deflection sensor 16, an optical sensor, a mechanical switch, or the like is used. In this case, the conveyance of the sheet S is stopped based on not only the detection signal of the transverse tension sensor but also a detection signal of the deflection sensor. Thus, paper jam can be prevented in both the cases where the discharge of the sheet is hindered by an obstacle and where the sheet is subjected to transverse tension.

By the way, the above-mentioned control portion may be provided individually from a control portion for controlling the general operation of the printer, or may be provided as a part of the control portion for controlling the general operation of the printer.

Further, the printer may further include sound means and/or indication means for informing, when the control portion has stopped the operation of the conveyance roller, a user of the stop of the operation of the conveyance roller.

Second Embodiment

A second embodiment of this invention is different from the first embodiment in the type and the position of the sensor portion of the transverse tension sensor and the structure of the bias means for the movable pieces.

Figure 6A:
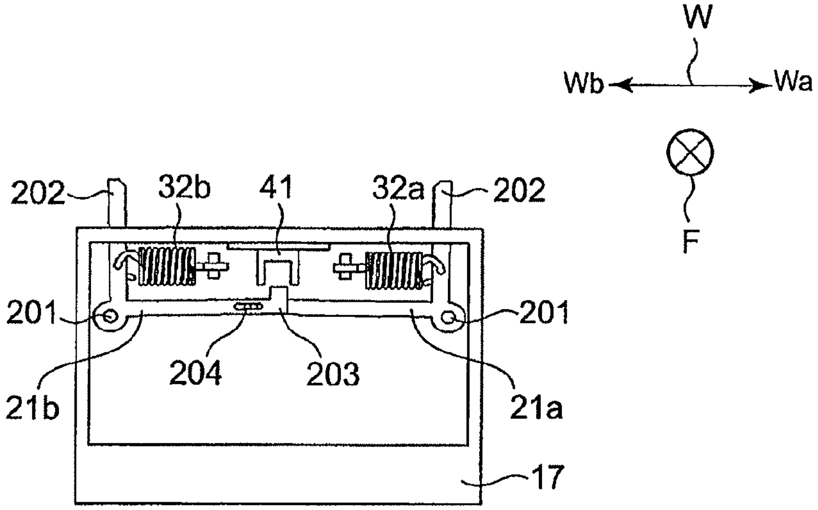
FIGS. 6A to 6C are schematic sectional views illustrating the configuration and operation of a main part of a printer according to a second embodiment of this invention.
Figure 6B:
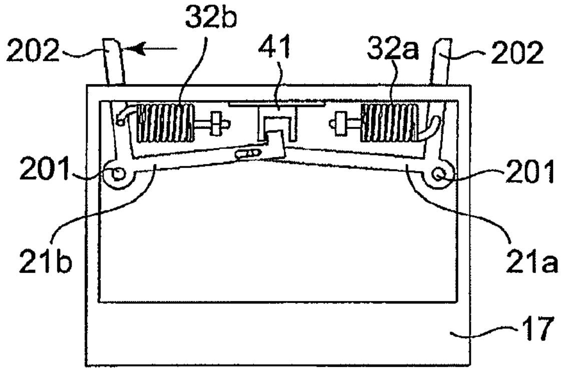
Figure 6C:
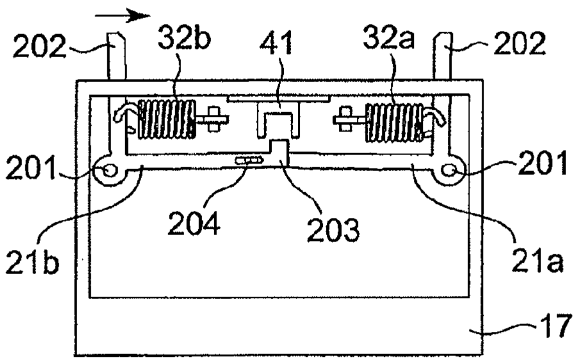

Referring to FIGS. 6A to 6C, a printer according to the second embodiment of this invention discharges the printed sheet S from the discharge port 13 in the discharging direction F similarly to the first embodiment as illustrated in FIG. 3.

The printer in the second embodiment includes a transverse tension sensor for detecting that the sheet S being discharged has deviated in the paper width direction W orthogonal to the discharging direction F, and the conveyance of the sheet is stopped based on a detection signal of the transverse tension sensor.

The transverse tension sensor in the second embodiment includes a pair of movable pieces 21*a* and 21*b*, and an optical sensor 41 as a sensor portion. The pair of movable pieces 21*a* and 21*b* and the optical sensor 41 as the sensor portion are mounted on the inner side of the front cover 17 (on the side facing the inside of the printer).

Each of the movable pieces 21*a* and 21*b* has a substantially L-shape and is mounted on the inner side of the front cover 17 so as to be pivotable about a support 201. The movable piece 21*a* is displaced when the sheet S is displaced to one side (Wa) in the paper width direction W, while the movable piece 21*b* is displaced when the sheet S is displaced to the other side (Wb) in the paper width direction W. As described below, both the movable pieces are coupled together and therefore displaced in association with each other.

In the vicinity of one end of the L-shape of each of the movable pieces 21*a* and 21*b*, a slide shaft 204 formed of a combination of an elongated hole and a stud is provided to couple the movable pieces 21*a* and 21*b* together.

The other end of the L-shape of each of the movable pieces 21*a* and 21*b* protrudes from an elongated hole formed in the upper surface of the front cover 17, and forms a guide portion 202. Both the guide portions 202 are positioned so that, when the front cover 17 is mounted to the printer, the guide portions 202 may sandwich the discharged sheet S in the paper width direction W immediately ahead of the discharge port 13. At least the guide portion 202 of each of the movable pieces 21*a* and 21*b* is made of a material having low friction and has a finished surface.

To the respective movable pieces 21*a* and 21*b*, coil springs 32*a* and 32*b* serving as bias means for biasing the guide portions 202 inward in the paper width direction W are mounted to the movable pieces 21*a* and 21*b* individually. The coil springs 32*a* and 32*b* as the bias means respectively bias the movable pieces 21*a* and 21*b* inward in the paper width direction W so that the guide portions 202 may have an interval therebetween corresponding to the width dimension of the sheet S. A biasing force of the coil springs 32*a* and 32*b* as the bias means is set to be larger than a force of discharging the sheet S by the conveyance roller 14. The sheet S discharged from the discharge port 13 in the discharging direction F is therefore restricted from deviating in the paper width direction W to some extent.

In addition, at one end of one of the movable pieces 21*a* and 21*b* (the movable piece 21*b* in this example), an extending portion 203 is formed so as to extend toward the optical sensor 41 as the sensor portion. The extending portion 203 of the movable piece 21*b* is displaced not only when the movable piece 21*b* is displaced but also when the movable piece 21*a* is displaced, because the movable pieces 21*a* and 21*b* are coupled together by the slide shaft 204.

The optical sensor 41 as the sensor portion includes a light source of detection light and a light receiving element which are opposed to each other. Based on whether or not the detection light is blocked by the extending portion 203 of the movable piece 21*b*, the optical sensor 41 detects the displacement of the movable pieces 21*a* and 21*b* as the state where the sheet S has deviated in the paper width direction W, that is, the sheet S has been subjected to transverse tension. The illustrated example represents a normal discharge state when the detection light passes and represents a state under transverse tension when the detection light is blocked.

In this transverse tension sensor, when the sheet S is being discharged, if a user pulls the sheet S transversely with a force equal to or stronger than the biasing force of the coil springs 32*a* and 32*b* as the bias means, the guide portion of the movable piece on the side where the sheet is pulled is tilted outward in the paper width direction W, and, as illustrated in FIG. 6B, both the coupled movable pieces 21*a* and 21*b* are displaced and the extending portion 203 is displaced so as to enter the optical sensor 41. When the detection light that has passed is blocked by the extending portion 203, the optical sensor 41 as the sensor portion outputs a detection signal indicating that the sheet S has deviated in the paper width direction W, that is, the sheet S has been subjected to transverse tension. Then, based on the detection signal, the rotation of the conveyance roller 14 is stopped. Note that, in response to the detection signal indicating that the sheet S has been subjected to the transverse tension, a control portion (not shown) of the printer according to this invention stops the rotation of the conveyance roller 14.

Also the printer in the second embodiment further includes, as illustrated in FIG. 3, the retreat region for the sheet and the deflection sensor 16 for detecting the sheet S that has entered the retreat region. The conveyance of the sheet S is therefore stopped based on not only the detection signal of the transverse tension sensor but also a detection signal of the deflection sensor. Thus, paper jam can be prevented in both the cases where the discharge of the sheet is hindered by an obstacle and where the sheet is subjected to transverse tension.

By the way, the above-mentioned control portion may be provided individually from a control portion for controlling the general operation of the printer, or may be provided as a part of the control portion for controlling the general operation of the printer. Further, the printer may further include sound means and/or indication means for informing, when the control portion has stopped the operation of the conveyance roller, a user of the stop of the operation of the conveyance roller.

Third Embodiment

Figure 7A:
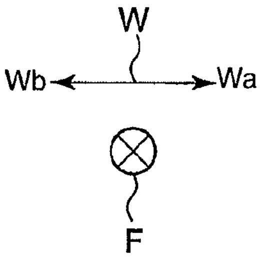
FIGS. 7A, 7B, and 7C are schematic sectional views illustrating the configuration of a main part of a printer according to third, fourth, and fifth embodiments of this invention, respectively.
Figure 7A:
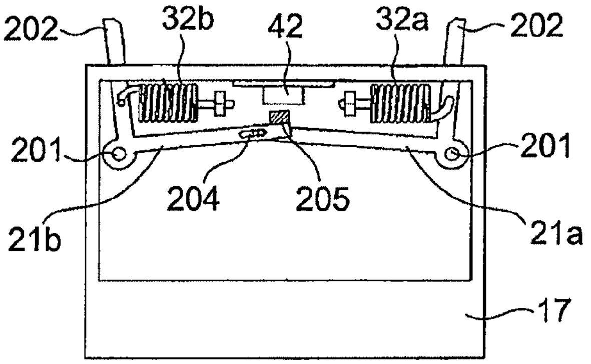

A third embodiment of this invention is different from the first and second embodiments in the type of the sensor portion of the transverse tension sensor. Detailed descriptions of the same or similar portions to those in the first and second embodiments are therefore omitted. Referring to FIG. 7A, a printer according to the third embodiment of this invention discharges the printed sheet S from the discharge port 13 in the discharging direction F similarly to the first and second embodiments as illustrated in FIG. 3. The printer in the third embodiment includes a transverse tension sensor for detecting that the sheet S being discharged has deviated in the paper width direction W orthogonal to the discharging direction F, and the conveyance of the sheet is stopped based on a detection signal of the transverse tension sensor. The transverse tension sensor in the third embodiment includes a pair of movable pieces 21*a* and 21*b*, and a magnetic sensor 42 as a sensor portion. The pair of movable pieces 21*a* and 21*b* and the magnetic sensor 42 as the sensor portion are mounted on the inner side of the front cover 17 (on the side facing the inside of the printer). Each of the movable pieces 21*a* and 21*b* has a substantially L-shape and is mounted on the inner side of the front cover 17 so as to be pivotable about a support 201. The movable piece 21*a* is displaced when the sheet S is displaced to one side (Wa) in the paper width direction W, while the movable piece 21*b* is displaced when the sheet S is displaced to the other side (Wb) in the paper width direction W. As described below, both the movable pieces are coupled together and therefore displaced in association with each other. In the vicinity of one end of the L-shape of each of the movable pieces 21*a* and 21*b*, a slide shaft 204 formed of a combination of an elongated hole and a stud is provided to couple the movable pieces 21*a* and 21*b* together. The other end of the L-shape of each of the movable pieces 21*a* and 21*b* protrudes from an elongated hole formed in the upper surface of the front cover 17, and forms a guide portion 202. Both the guide portions 202 are positioned so that, when the front cover 17 is mounted to the printer, the guide portions 202 may sandwich the discharged sheet S in the paper width direction W immediately ahead of the discharge port 13. At least the guide portion 202 of each of the movable pieces 21*a* and 21*b* is made of a material having low friction and has a finished surface. To the respective movable pieces 21*a* and 21*b*, coil springs 32*a* and 32*b* serving as bias means for biasing the guide portions 202 inward in the paper width direction W are mounted to the movable pieces 21*a* and 21*b* individually. The coil springs 32*a* and 32*b* as the bias means respectively bias the movable pieces 21*a* and 21*b* inward in the paper width direction W so that the guide portions 202 may have an interval therebetween corresponding to the width dimension of the sheet S. A biasing force of the coil springs 32*a* and 32*b* as the bias means is set to be larger than a force of discharging the sheet S by the conveyance roller 14. The sheet S discharged from the discharge port 13 in the discharging direction F is therefore restricted from deviating in the paper width direction W to some extent.

In addition, at one end of one of the movable pieces 21*a* and 21*b* (the movable piece 21*b* in this example), a permanent magnet 205 is mounted so as to protrude toward the magnetic sensor 42 as the sensor portion. The permanent magnet 205 mounted to the movable piece 21*b* is displaced not only when the movable piece 21*b* is displaced but also when the movable piece 21*a* is displaced, because the movable pieces 21*a* and 21*b* are coupled together by the slide shaft 204.

The magnetic sensor 42 as the sensor portion detects the displacement of the movable pieces 21*a* and 21*b* as the state where the sheet S has deviated in the paper width direction W, that is, the sheet S has been subjected to transverse tension, based on whether or not the magnetic flux of a predetermined value or more is detected by an approach of the permanent magnet 205 mounted to the movable piece 21*b*. The illustrated example represents a normal discharge state when the magnetic flux of the predetermined value or more is not detected and represents a state under transverse tension when the magnetic flux of the predetermined value or more is detected.

In this transverse tension sensor, when the sheet S is being discharged, if a user pulls the sheet S transversely with a force equal to or stronger than the biasing force of the coil springs 32*a* and 32*b* as the bias means, the guide portion of the movable piece on the side where the sheet is pulled is tilted outward in the paper width direction W, and, as illustrated in FIG. 7A, both the coupled movable pieces 21*a* and 21*b* are displaced and the permanent magnet 205 is displaced so as to approach the magnetic sensor 42. When the magnetic flux of the predetermined value or more is detected, the magnetic sensor 42 as the sensor portion outputs a detection signal indicating that the sheet S has deviated in the paper width direction W, that is, the sheet S has been subjected to transverse tension. Then, based on the detection signal, the rotation of the conveyance roller 14 is stopped. Note that, in response to the detection signal indicating that the sheet S has been subjected to the transverse tension, a control portion (not shown) of the printer according to this invention stops the rotation of the conveyance roller 14.

Also the printer in the third embodiment further includes, as illustrated in FIG. 3, the retreat region for the sheet and the deflection sensor 16 for detecting the sheet S that has entered the retreat region. The conveyance of the sheet S is therefore stopped based on not only the detection signal of the transverse tension sensor but also a detection signal of the deflection sensor. Thus, paper jam can be prevented in both the cases where the discharge of the sheet is hindered by an obstacle and where the sheet is subjected to transverse tension.

By the way, the above-mentioned control portion may be provided individually from a control portion for controlling the general operation of the printer, or may be provided as a part of the control portion for controlling the general operation of the printer. Further, the printer may further include sound means and/or indication means for informing, when the control portion has stopped the operation of the conveyance roller, a user of the stop of the operation of the conveyance roller.

Fourth Embodiment

A fourth embodiment of this invention is different from the first to third embodiments in the type of the sensor portion of the transverse tension sensor. Detailed descriptions of the same or similar portions to those in the first to third embodiments are therefore omitted.

Figure 7B:
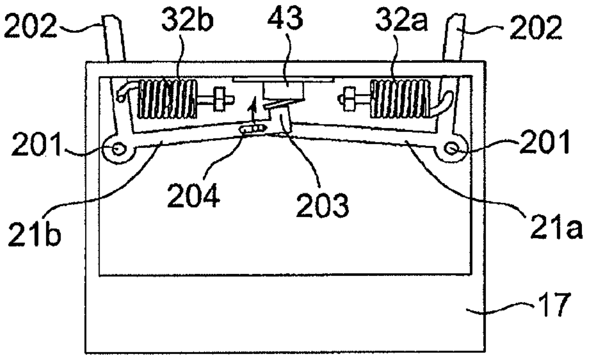

Referring to FIG. 7B, a printer according to the fourth embodiment of this invention discharges the printed sheet S from the discharge port 13 in the discharging direction F similarly to the first to third embodiments as illustrated in FIG. 3. The printer in the fourth embodiment includes a transverse tension sensor for detecting that the sheet S being discharged has deviated in the paper width direction W orthogonal to the discharging direction F, and the conveyance of the sheet is stopped based on a detection signal of the transverse tension sensor.

The transverse tension sensor in the fourth embodiment includes a pair of movable pieces 21*a* and 21*b*, and a mechanical switch 43 as a sensor portion. The pair of movable pieces 21*a* and 21*b* and the mechanical switch 43 as the sensor portion are mounted on the inner side of the front cover 17 (on the side facing the inside of the printer).

Each of the movable pieces 21*a* and 21*b* has a substantially L-shape and is mounted on the inner side of the front cover 17 so as to be pivotable about a support 201. The movable piece 21*a* is displaced when the sheet S is displaced to one side (Wa) in the paper width direction W, while the movable piece 21*b* is displaced when the sheet S is displaced to the other side (Wb) in the paper width direction W. As described below, both the movable pieces are coupled together and therefore displaced in association with each other.

In the vicinity of one end of the L-shape of each of the movable pieces 21*a* and 21*b*, a slide shaft 204 formed of a combination of an elongated hole and a stud is provided to couple the movable pieces 21*a* and 21*b* together. The other end of the L-shape of each of the movable pieces 21*a* and 21*b* protrudes from an elongated hole formed in the upper surface of the front cover 17, and forms a guide portion 202. Both the guide portions 202 are positioned so that, when the front cover 17 is mounted to the printer, the guide portions 202 may sandwich the discharged sheet S in the paper width direction W immediately ahead of the discharge port 13. At least the guide portion 202 of each of the movable pieces 21*a* and 21*b* is made of a material having low friction and has a finished surface. To the respective movable pieces 21*a* and 21*b*, coil springs 32*a* and 32*b* serving as bias means for biasing the guide portions 202 inward in the paper width direction W are mounted to the movable pieces 21*a* and 21*b* individually. The coil springs 32*a* and 32*b* as the bias means respectively bias the movable pieces 21*a* and 21*b* inward in the paper width direction W so that the guide portions 202 may have an interval therebetween corresponding to the width dimension of the sheet S. A biasing force of the coil springs 32*a* and 32*b* as the bias means is set to be larger than a force of discharging the sheet S by the conveyance roller 14. The sheet S discharged from the discharge port 13 in the discharging direction F is therefore restricted from deviating in the paper width direction W to some extent.

In addition, at one end of one of the movable pieces 21*a* and 21*b* (the movable piece 21*b* in this example), an extending portion 203 is formed so as to extend toward the mechanical switch 43 as the sensor portion. The extending portion 203 formed on the movable piece 21*b* is displaced not only when the movable piece 21*b* is displaced but also when the movable piece 21*a* is displaced, because the movable pieces 21*a* and 21*b* are coupled together by the slide shaft 204.

The mechanical switch 43 as the sensor portion detects the displacement of the movable pieces 21*a* and 21*b* as the state where the sheet S has deviated in the paper width direction W, that is, the sheet S has been subjected to transverse tension, when the mechanical switch 43 is pushed by the extending portion 203 formed on the movable piece 21*b*. The illustrated example represents a normal discharge state when the mechanical switch 43 is not pushed by the extending portion 203 and represents a state under transverse tension when the mechanical switch 43 is pushed by the extending portion 203.

In this transverse tension sensor, when the sheet S is being discharged, if a user pulls the sheet S transversely with a force equal to or stronger than the biasing force of the coil springs 32*a* and 32*b* as the bias means, the guide portion of the movable piece on the side where the sheet is pulled is tilted outward in the paper width direction W, and, as illustrated in FIG. 7B, both the coupled movable pieces 21*a* and 21*b* are displaced and the extending portion 203 is displaced so as to push the mechanical switch 43. When the mechanical switch 43 as the sensor portion is pushed by the extending portion 203, the mechanical switch 43 outputs a detection signal indicating that the sheet S has deviated in the paper width direction W, that is, the sheet S has been subjected to transverse tension. Then, based on the detection signal, the rotation of the conveyance roller 14 is stopped. Note that, in response to the detection signal indicating that the sheet S has been subjected to the transverse tension, a control portion (not shown) of the printer according to this invention stops the rotation of the conveyance roller 14.

Also the printer in the fourth embodiment further includes, as illustrated in FIG. 3, the retreat region for the sheet and the deflection sensor 16 for detecting the sheet S that has entered the retreat region. The conveyance of the sheet S is therefore stopped based on not only the detection signal of the transverse tension sensor but also a detection signal of the deflection sensor. Thus, paper jam can be prevented in both the cases where the discharge of the sheet is hindered by an obstacle and where the sheet is subjected to transverse tension.

By the way, the above-mentioned control portion may be provided individually from a control portion for controlling the general operation of the printer, or may be provided as a part of the control portion for controlling the general operation of the printer. Further, the printer may further include sound means and/or indication means for informing, when the control portion has stopped the operation of the conveyance roller, a user of the stop of the operation of the conveyance roller.

Fifth Embodiment

A fifth embodiment of this invention is different from the first to fourth embodiments in the bias means for the pair of movable pieces of the transverse tension sensor. Detailed descriptions of the same or similar portions to those in the first to fourth embodiments are therefore omitted.

Figure 7C:
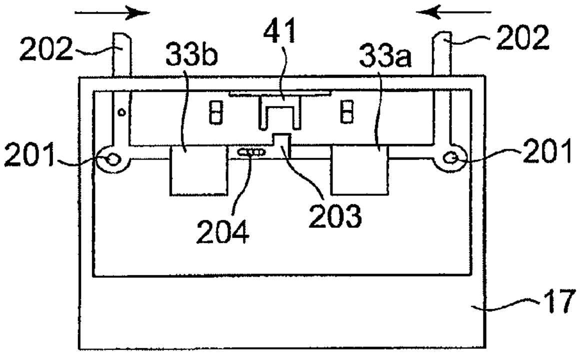

Referring to FIG. 7C, a printer according to the fifth embodiment of this invention discharges the printed sheet S from the discharge port 13 in the discharging direction F similarly to the first to fourth embodiments as illustrated in FIG. 3. The printer in the fifth embodiment includes a transverse tension sensor for detecting that the sheet S being discharged has deviated in the paper width direction W orthogonal to the discharging direction F, and the conveyance of the sheet is stopped based on a detection signal of the transverse tension sensor.

The transverse tension sensor in the fifth embodiment includes a pair of movable pieces 21*a* and 21*b*, and an optical sensor 41 as a sensor portion. The pair of movable pieces 21*a* and 21*b* and the optical sensor 41 as the sensor portion are mounted on the inner side of the front cover 17 (on the side facing the inside of the printer).

Each of the movable pieces 21*a* and 21*b* has a substantially L-shape and is mounted on the inner side of the front cover 17 so as to be pivotable about a support 201. The movable piece 21*a* is displaced when the sheet S is displaced to one side (Wa) in the paper width direction W, while the movable piece 21*b* is displaced when the sheet S is displaced to the other side (Wb) in the paper width direction W. As described below, both the movable pieces are coupled together and therefore displaced in association with each other.

In the vicinity of one end of the L-shape of each of the movable pieces 21*a* and 21*b*, a slide shaft 204 formed of a combination of an elongated hole and a stud is provided to couple the movable pieces 21*a* and 21*b* together. The other end of the L-shape of each of the movable pieces 21*a* and 21*b* protrudes from an elongated hole formed in the upper surface of the front cover 17, and forms a guide portion 202. Both the guide portions 202 are positioned so that, when the front cover 17 is mounted to the printer, the guide portions 202 may sandwich the discharged sheet S in the paper width direction W immediately ahead of the discharge port 13. At least the guide portion 202 of each of the movable pieces 21*a* and 21*b* is made of a material having low friction and has a finished surface. To the respective movable pieces 21*a* and 21*b*, weights 33*a* and 33*b* serving as bias means for biasing the guide portions 202 inward in the paper width direction W are mounted to the movable pieces 21*a* and 21*b* individually. The weights 33*a* and 33*b* as the bias means respectively bias the movable pieces 21*a* and 21*b* inward in the paper width direction W so that the guide portions 202 may have an interval therebetween corresponding to the width dimension of the sheet S. A biasing force of the weights 33*a* and 33*b* as the bias means is set to be larger than a force of discharging the sheet S by the conveyance roller 14. The sheet S discharged from the discharge port 13 in the discharging direction F is therefore restricted from deviating in the paper width direction W to some extent.

In addition, at one end of one of the movable pieces 21*a* and 21*b* (the movable piece 21*b* in this example), an extending portion 203 is formed so as to extend toward the optical sensor 41 as the sensor portion. The extending portion 203 formed on the movable piece 21*b* is displaced not only when the movable piece 21*b* is displaced but also when the movable piece 21*a* is displaced, because the movable pieces 21*a* and 21*b* are coupled together by the slide shaft 204.

The optical sensor 41 as the sensor portion includes a light source of detection light and a light receiving element which are opposed to each other. Based on whether or not the detection light is blocked by the extending portion 203 of the movable piece 21*b*, the optical sensor 41 detects the displacement of the movable pieces 21*a* and 21*b* as the state where the sheet S has deviated in the paper width direction W, that is, the sheet S has been subjected to transverse tension. The illustrated example represents a normal discharge state when the detection light passes and represents a state under transverse tension when the detection light is blocked.

In this transverse tension sensor, when the sheet S is being discharged, if a user pulls the sheet S transversely with a force equal to or stronger than the biasing force of the weights 33*a* and 33*b* as the bias means, the guide portion of the movable piece on the side where the sheet is pulled is tilted outward in the paper width direction W, and both the coupled movable pieces 21*a* and 21*b* are displaced and the extending portion 203 is displaced so as to enter the optical sensor 41. When the detection light that has passed is blocked by the extending portion 203, the optical sensor 41 as the sensor portion outputs a detection signal indicating that the sheet S has deviated in the paper width direction W, that is, the sheet S has been subjected to transverse tension. Then, based on the detection signal, the rotation of the conveyance roller 14 is stopped.

Note that, in response to the detection signal indicating that the sheet S has been subjected to the transverse tension, a control portion (not shown) of the printer according to this invention stops the rotation of the conveyance roller 14.

Also the printer in the fifth embodiment further includes, as illustrated in FIG. 3, the retreat region for the sheet and the deflection sensor 16 for detecting the sheet S that has entered the retreat region. The conveyance of the sheet S is therefore stopped based on not only the detection signal of the transverse tension sensor but also a detection signal of the deflection sensor. Thus, paper jam can be prevented in both the cases where the discharge of the sheet is hindered by an obstacle and where the sheet is subjected to transverse tension.

By the way, the above-mentioned control portion may be provided individually from a control portion for controlling the general operation of the printer, or may be provided as a part of the control portion for controlling the general operation of the printer. Further, the printer may further include sound means and/or indication means for informing, when the control portion has stopped the operation of the conveyance roller, a user of the stop of the operation of the conveyance roller.

Sixth Embodiment

A sixth embodiment of this invention is different from the first to fifth embodiments in the structure of the pair of movable pieces of the transverse tension sensor. Detailed descriptions of the same or similar portions to those in the first to fifth embodiments are therefore omitted.

Figure 8A:
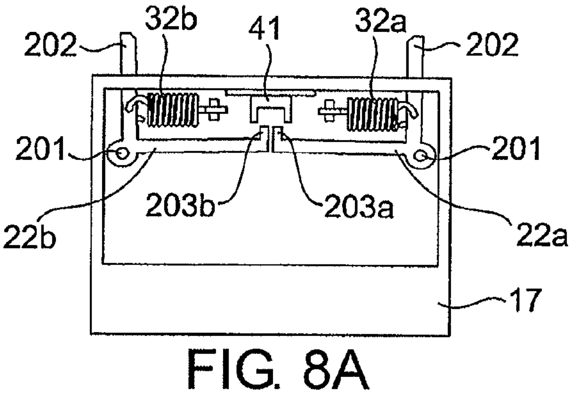
FIGS. 8A, 8B, 8C, and 8D are schematic sectional views illustrating the configuration of a main part of a printer according to sixth, seventh, eighth, and ninth embodiments of this invention, respectively.
Figure 8A:
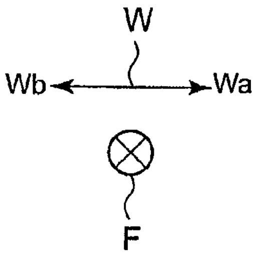

Referring to FIG. 8A, a printer according to the sixth embodiment of this invention discharges the printed sheet S from the discharge port 13 in the discharging direction F similarly to the first to fifth embodiments as illustrated in FIG. 3. The printer in the sixth embodiment includes a transverse tension sensor for detecting that the sheet S being discharged has deviated in the paper width direction W orthogonal to the discharging direction F, and the conveyance of the sheet is stopped based on a detection signal of the transverse tension sensor.

The transverse tension sensor in the sixth embodiment includes a pair of movable pieces 22*a* and 22*b*, and an optical sensor 41 as a sensor portion. The pair of movable pieces 22*a* and 22*b* and the optical sensor 41 as the sensor portion are mounted on the inner side of the front cover 17 (on the side facing the inside of the printer).

Each of the movable pieces 22*a* and 22*b* has a substantially L-shape and is mounted on the inner side of the front cover 17 so as to be pivotable about a support 201. The movable piece 22*a* is displaced when the sheet S is displaced to one side (Wa) in the paper width direction W, while the movable piece 22*b* is displaced when the sheet S is displaced to the other side (Wb) in the paper width direction W.

The other end of the L-shape of each of the movable pieces 22*a* and 22*b* protrudes from an elongated hole formed in the upper surface of the front cover 17, and forms a guide portion 202. Both the guide portions 202 are positioned so that, when the front cover 17 is mounted to the printer, the guide portions 202 may sandwich the discharged sheet S in the paper width direction W immediately ahead of the discharge port 13. At least the guide portion 202 of each of the movable pieces 22*a* and 22*b* is made of a material having low friction and has a finished surface. To the respective movable pieces 22*a* and 22*b*, coil springs 32*a* and 32*b* serving as bias means for biasing the guide portions 202 inward in the paper width direction W are mounted. The coil springs 32*a* and 32*b* as the bias means respectively bias the movable pieces 22*a* and 22*b* inward in the paper width direction W so that the guide portions 202 may have an interval therebetween corresponding to the width dimension of the sheet S. A biasing force of each of the coil springs 32*a* and 32*b* as the bias means is set to be larger than a force of discharging the sheet S by the conveyance roller 14. The sheet S discharged from the discharge port 13 in the discharging direction F is therefore restricted from deviating in the paper width direction W to some extent.

In addition, at one ends of the movable pieces 22*a* and 22*b*, extending portions 203*a* and 203*b* are formed so as to extend toward the optical sensor 41 as the sensor portion.

The optical sensor 41 as the sensor portion includes a light source of detection light and a light receiving element which are opposed to each other. Based on whether or not the detection light is blocked by the extending portion 203*a* of the movable piece 22*a* or the extending portion 203*b* of the movable piece 22*b*, the optical sensor 41 detects the displacement of the movable piece 22*a* or 22*b* as the state where the sheet S has deviated in the paper width direction W, that is, the sheet S has been subjected to transverse tension. The illustrated example represents a normal discharge state when the detection light passes and represents a state under transverse tension when the detection light is blocked.

In this transverse tension sensor, when the sheet S is being discharged, if a user pulls the sheet S transversely with a force equal to or stronger than the biasing force of each of the coil springs 32*a* and 32*b* as the bias means, the guide portion of the movable piece on the side where the sheet is pulled is tilted outward in the paper width direction W, and one of the movable pieces 22*a* and 22*b* is displaced and the extending portion 203*a* or 203*b* is displaced so as to enter the optical sensor 41. When the detection light that has passed is blocked by the extending portion 203*a* or 203*b*, the optical sensor 41 as the sensor portion outputs a detection signal indicating that the sheet S has deviated in the paper width direction W, that is, the sheet S has been subjected to transverse tension. Then, based on the detection signal, the rotation of the conveyance roller 14 is stopped. Note that, in response to the detection signal indicating that the sheet S has been subjected to the transverse tension, a control portion (not shown) of the printer according to this invention stops the rotation of the conveyance roller 14.

Also the printer in the sixth embodiment further includes, as illustrated in FIG. 3, the retreat region for the sheet and the deflection sensor 16 for detecting the sheet S that has entered the retreat region. The conveyance of the sheet S is therefore stopped based on not only the detection signal of the transverse tension sensor but also a detection signal of the deflection sensor. Thus, paper jam can be prevented in both the cases where the discharge of the sheet is hindered by an obstacle and where the sheet is subjected to transverse tension.

By the way, the above-mentioned control portion may be provided individually from a control portion for controlling the general operation of the printer, or may be provided as a part of the control portion for controlling the general operation of the printer. Further, the printer may further include sound means and/or indication means for informing, when the control portion has stopped the operation of the conveyance roller, a user of the stop of the operation of the conveyance roller.

Seventh Embodiment

A seventh embodiment of this invention is different from the sixth embodiment in that the number of the sensor portions of the transverse tension sensor is two. Detailed descriptions of the same or similar portions to those in the sixth embodiment are therefore omitted.

Figure 8B:
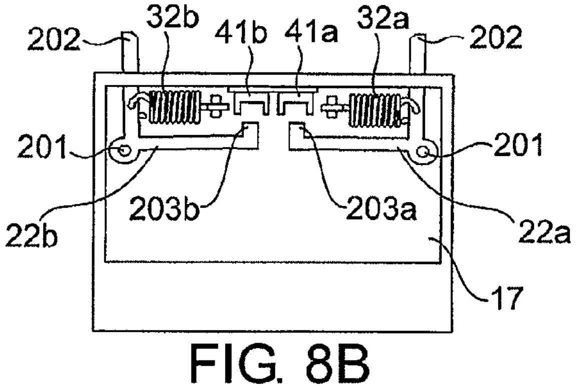

Referring to FIG. 8B, a printer according to the seventh embodiment of this invention discharges the printed sheet S from the discharge port 13 in the discharging direction F similarly to the sixth embodiment as illustrated in FIG. 3. The printer in the seventh embodiment includes a transverse tension sensor for detecting that the sheet S being discharged has deviated in the paper width direction W orthogonal to the discharging direction F, and the conveyance of the sheet is stopped based on a detection signal of the transverse tension sensor.

The transverse tension sensor in the seventh embodiment includes a pair of movable pieces 22*a* and 22*b*, and optical sensors 41*a* and 41*b* as sensor portions. The pair of movable pieces 22*a* and 22*b* and the optical sensors 41*a* and 41*b* as the sensor portions are mounted on the inner side of the front cover 17 (on the side facing the inside of the printer).

Each of the movable pieces 22*a* and 22*b* has a substantially L-shape and is mounted on the inner side of the front cover 17 so as to be pivotable about a support 201. The movable piece 22*a* is displaced when the sheet S is displaced to one side (Wa) in the paper width direction W, while the movable piece 22*b* is displaced when the sheet S is displaced to the other side (Wb) in the paper width direction W.

The other end of the L-shape of each of the movable pieces 22*a* and 22*b* protrudes from an elongated hole formed in the upper surface of the front cover 17, and forms a guide portion 202. Both the guide portions 202 are positioned so that, when the front cover 17 is mounted to the printer, the guide portions 202 may sandwich the discharged sheet S in the paper width direction W immediately ahead of the discharge port 13. At least the guide portion 202 of each of the movable pieces 22*a* and 22*b* is made of a material having low friction and has a finished surface. To the respective movable pieces 22*a* and 22*b*, coil springs 32*a* and 32*b* serving as bias means for biasing the guide portions 202 inward in the paper width direction W are mounted. The coil springs 32*a* and 32*b* as the bias means respectively bias the movable pieces 22*a* and 22*b* inward in the paper width direction W so that the guide portions 202 may have an interval therebetween corresponding to the width dimension of the sheet S. A biasing force of each of the coil springs 32*a* and 32*b* as the bias means is set to be larger than a force of discharging the sheet S by the conveyance roller 14. The sheet S discharged from the discharge port 13 in the discharging direction F is therefore restricted from deviating in the paper width direction W to some extent.

In addition, at one ends of the movable pieces 22*a* and 22*b*, extending portions 203*a* and 203*b* are formed so as to extend toward the optical sensors 41*a* and 41*b* as the sensor portions, respectively.

Each of the optical sensors 41*a* and 41*b* as the sensor portions includes a light source of detection light and a light receiving element which are opposed to each other. Based on whether or not the detection light is blocked by the extending portion 203*a* of the movable piece 22*a* or the extending portion 203*b* of the movable piece 22*b*, the optical sensor 41*a* or 41*b* detects the displacement of the movable piece 22*a* or 22*b* as the state where the sheet S has deviated in the paper width direction W, that is, the sheet S has been subjected to transverse tension. The illustrated example represents a normal discharge state when the detection light passes and represents a state under transverse tension when the detection light is blocked.

In this transverse tension sensor, when the sheet S is being discharged, if a user pulls the sheet S transversely with a force equal to or stronger than the biasing force of each of the coil springs 32*a* and 32*b* as the bias means, the guide portion of the movable piece on the side where the sheet is pulled is tilted outward in the paper width direction W, and one of the movable pieces 22*a* and 22*b* is displaced and the extending portion 203*a* or 203*b* is displaced so as to enter the optical sensor 41*a* or 41*b*. When the detection light that has passed is blocked by the extending portion 203*a* or 203*b*, the optical sensor 41*a* or 41*b* as the sensor portion outputs a detection signal indicating that the sheet S has deviated in the paper width direction W, that is, the sheet S has been subjected to transverse tension. Then, based on the detection signal, the rotation of the conveyance roller 14 is stopped. Note that, in response to the detection signal indicating that the sheet S has been subjected to the transverse tension, a control portion (not shown) of the printer according to this invention stops the rotation of the conveyance roller 14.

Also the printer in the seventh embodiment further includes, as illustrated in FIG. 3, the retreat region for the sheet and the deflection sensor 16 for detecting the sheet S that has entered the retreat region. The conveyance of the sheet S is therefore stopped based on not only the detection signal of the transverse tension sensor but also a detection signal of the deflection sensor. Thus, paper jam can be prevented in both the cases where the discharge of the sheet is hindered by an obstacle and where the sheet is subjected to transverse tension.

By the way, the above-mentioned control portion may be provided individually from a control portion for controlling the general operation of the printer, or may be provided as a part of the control portion for controlling the general operation of the printer. Further, the printer may further include sound means and/or indication means for informing, when the control portion has stopped the operation of the conveyance roller, a user of the stop of the operation of the conveyance roller.

Eighth Embodiment

An eighth embodiment of this invention is different from the sixth embodiment in the type of the sensor portion of the transverse tension sensor. Detailed descriptions of the same or similar portions to those in the sixth embodiment are therefore omitted.

Figure 8C:
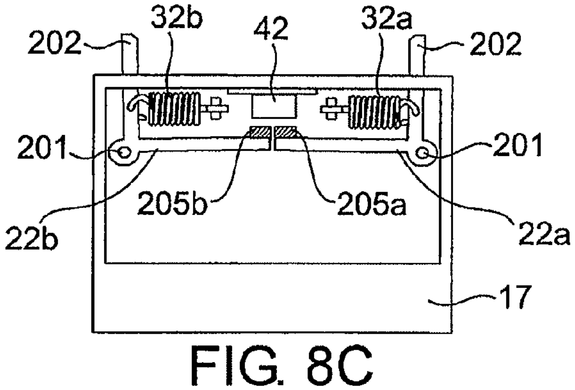

Referring to FIG. 8C, a printer according to the eighth embodiment of this invention discharges the printed sheet S from the discharge port 13 in the discharging direction F similarly to the sixth embodiment as illustrated in FIG. 3. The printer in the eighth embodiment includes a transverse tension sensor for detecting that the sheet S being discharged has deviated in the paper width direction W orthogonal to the discharging direction F, and the conveyance of the sheet is stopped based on a detection signal of the transverse tension sensor.

The transverse tension sensor in the eighth embodiment includes a pair of movable pieces 22*a* and 22*b*, and a magnetic sensor 42 as a sensor portion. The pair of movable pieces 22*a* and 22*b* and the magnetic sensor 42 as the sensor portion are mounted on the inner side of the front cover 17 (on the side facing the inside of the printer).

Each of the movable pieces 22*a* and 22*b* has a substantially L-shape and is mounted on the inner side of the front cover 17 so as to be pivotable about a support 201. The movable piece 22*a* is displaced when the sheet S is displaced to one side (Wa) in the paper width direction W, while the movable piece 22*b* is displaced when the sheet S is displaced to the other side (Wb) in the paper width direction W.

The other end of the L-shape of each of the movable pieces 22*a* and 22*b* protrudes from an elongated hole formed in the upper surface of the front cover 17, and forms a guide portion 202. Both the guide portions 202 are positioned so that, when the front cover 17 is mounted to the printer, the guide portions 202 may sandwich the discharged sheet S in the paper width direction W immediately ahead of the discharge port 13. At least the guide portion 202 of each of the movable pieces 22*a* and 22*b* is made of a material having low friction and has a finished surface. To the respective movable pieces 22*a* and 22*b*, coil springs 32*a* and 32*b* serving as bias means for biasing the guide portions 202 inward in the paper width direction W are mounted. The coil springs 32*a* and 32*b* as the bias means respectively bias the movable pieces 22*a* and 22*b* inward in the paper width direction W so that the guide portions 202 may have an interval therebetween corresponding to the width dimension of the sheet S. A biasing force of each of the coil springs 32*a* and 32*b* as the bias means is set to be larger than a force of discharging the sheet S by the conveyance roller 14. The sheet S discharged from the discharge port 13 in the discharging direction F is therefore restricted from deviating in the paper width direction W to some extent.

In addition, at one ends of the movable pieces 22*a* and 22*b*, permanent magnets 205*a* and 205*b* are mounted so as to protrude toward the magnetic sensor 42 as the sensor portion.

The magnetic sensor 42 as the sensor portion detects the displacement of the movable piece 22*a* or 22*b* as the state where the sheet S has deviated in the paper width direction W, that is, the sheet S has been subjected to transverse tension, based on whether or not the magnetic flux of a predetermined value or more is detected by an approach of the permanent magnet 205*a* or 205*b* mounted to the movable piece 22*a* or 22*b*. The illustrated example represents a normal discharge state when the magnetic flux of the predetermined value or more is not detected and represents a state under transverse tension when the magnetic flux of the predetermined value or more is detected.

In this transverse tension sensor, when the sheet S is being discharged, if a user pulls the sheet S transversely with a force equal to or stronger than the biasing force of each of the coil springs 32*a* and 32*b* as the bias means, the guide portion of the movable piece on the side where the sheet is pulled is tilted outward in the paper width direction W, and one of the movable pieces 22*a* and 22*b* is displaced and the permanent magnet 205*a* or 205*b* is displaced so as to approach the magnetic sensor 42. When the magnetic flux of the predetermined value or more is detected, the magnetic sensor 42 as the sensor portion outputs a detection signal indicating that the sheet S has deviated in the paper width direction W, that is, the sheet S has been subjected to transverse tension. Then, based on the detection signal, the rotation of the conveyance roller 14 is stopped. Note that, in response to the detection signal indicating that the sheet S has been subjected to the transverse tension, a control portion (not shown) of the printer according to this invention stops the rotation of the conveyance roller 14.

Also the printer in the eighth embodiment further includes, as illustrated in FIG. 3, the retreat region for the sheet and the deflection sensor 16 for detecting the sheet S that has entered the retreat region. The conveyance of the sheet S is therefore stopped based on not only the detection signal of the transverse tension sensor but also a detection signal of the deflection sensor. Thus, paper jam can be prevented in both the cases where the discharge of the sheet is hindered by an obstacle and where the sheet is subjected to transverse tension.

By the way, the above-mentioned control portion may be provided individually from a control portion for controlling the general operation of the printer, or may be provided as a part of the control portion for controlling the general operation of the printer. Further, the printer may further include sound means and/or indication means for informing, when the control portion has stopped the operation of the conveyance roller, a user of the stop of the operation of the conveyance roller.

Ninth Embodiment

A ninth embodiment of this invention is different from the eighth embodiment in that the number of the sensor portions of the transverse tension sensor is two. Detailed descriptions of the same or similar portions to those in the eighth embodiment are therefore omitted.

Figure 8D:
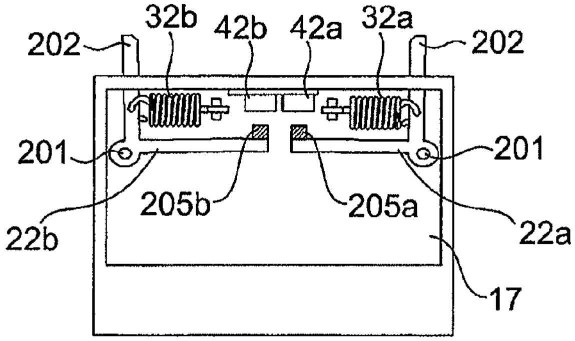

Referring to FIG. 8D, a printer according to the ninth embodiment of this invention discharges the printed sheet S from the discharge port 13 in the discharging direction F similarly to the eighth embodiment as illustrated in FIG. 3. The printer in the ninth embodiment includes a transverse tension sensor for detecting that the sheet S being discharged has deviated in the paper width direction W orthogonal to the discharging direction F, and the conveyance of the sheet is stopped based on a detection signal of the transverse tension sensor.

The transverse tension sensor in the ninth embodiment includes a pair of movable pieces 22*a* and 22*b*, and magnetic sensors 42*a* and 42*b* as sensor portions. The pair of movable pieces 22*a* and 22*b* and the magnetic sensors 42*a* and 42*b* as the sensor portions are mounted on the inner side of the front cover 17 (on the side facing the inside of the printer).

Each of the movable pieces 22*a* and 22*b* has a substantially L-shape and is mounted on the inner side of the front cover 17 so as to be pivotable about a support 201. The movable piece 22*a* is displaced when the sheet S is displaced to one side (Wa) in the paper width direction W, while the movable piece 22*b* is displaced when the sheet S is displaced to the other side (Wb) in the paper width direction W.

The other end of the L-shape of each of the movable pieces 22*a* and 22*b* protrudes from an elongated hole formed in the upper surface of the front cover 17, and forms a guide portion 202. Both the guide portions 202 are positioned so that, when the front cover 17 is mounted to the printer, the guide portions 202 may sandwich the discharged sheet S in the paper width direction W immediately ahead of the discharge port 13. At least the guide portion 202 of each of the movable pieces 22*a* and 22*b* is made of a material having low friction and has a finished surface. To the respective movable pieces 22*a* and 22*b*, coil springs 32*a* and 32*b* serving as bias means for biasing the guide portions 202 inward in the paper width direction W are mounted. The coil springs 32*a* and 32*b* as the bias means respectively bias the movable pieces 22*a* and 22*b* inward in the paper width direction W so that the guide portions 202 may have an interval therebetween corresponding to the width dimension of the sheet S. A biasing force of each of the coil springs 32*a* and 32*b* as the bias means is set to be larger than a force of discharging the sheet S by the conveyance roller 14. The sheet S discharged from the discharge port 13 in the discharging direction F is therefore restricted from deviating in the paper width direction W to some extent.

In addition, at one ends of the movable pieces 22*a* and 22*b*, permanent magnets 205*a* and 205*b* are mounted so as to protrude toward the magnetic sensors 42*a* and 42*b* as the sensor portions, respectively.

The magnetic sensor 42*a* or 42*b* as the sensor portion detects the displacement of the movable piece 22*a* or 22*b* as the state where the sheet S has deviated in the paper width direction W, that is, the sheet S has been subjected to transverse tension, based on whether or not the magnetic flux of a predetermined value or more is detected by an approach of the permanent magnet 205*a* or 205*b* mounted to the movable piece 22*a* or 22*b*. The illustrated example represents a normal discharge state when the magnetic flux of the predetermined value or more is not detected and represents a state under transverse tension when the magnetic flux of the predetermined value or more is detected.

In this transverse tension sensor, when the sheet S is being discharged, if a user pulls the sheet S transversely with a force equal to or stronger than the biasing force of each of the coil springs 32*a* and 32*b* as the bias means, the guide portion of the movable piece on the side where the sheet is pulled is tilted outward in the paper width direction W, and one of the movable pieces 22*a* and 22*b* is displaced and the permanent magnet 205*a* or 205*b* is displaced so as to approach the magnetic sensor 42*a* or 42*b*. When the magnetic flux of the predetermined value or more is detected, each of the magnetic sensors 42*a* and 42*b* as the sensor portions outputs a detection signal indicating that the sheet S has deviated in the paper width direction W, that is, the sheet S has been subjected to transverse tension. Then, based on the detection signal, the rotation of the conveyance roller 14 is stopped. Note that, in response to the detection signal indicating that the sheet S has been subjected to the transverse tension, a control portion (not shown) of the printer according to this invention stops the rotation of the conveyance roller 14.

Also the printer in the ninth embodiment further includes, as illustrated in FIG. 3, the retreat region for the sheet and the deflection sensor 16 for detecting the sheet S that has entered the retreat region. The conveyance of the sheet S is therefore stopped based on not only the detection signal of the transverse tension sensor but also a detection signal of the deflection sensor. Thus, paper jam can be prevented in both the cases where the discharge of the sheet is hindered by an obstacle and where the sheet is subjected to transverse tension.

By the way, the above-mentioned control portion may be provided individually from a control portion for controlling the general operation of the printer, or may be provided as a part of the control portion for controlling the general operation of the printer. Further, the printer may further include sound means and/or indication means for informing, when the control portion has stopped the operation of the conveyance roller, a user of the stop of the operation of the conveyance roller.

INDUSTRIAL APPLICABILITY

This invention has been described by means of embodiments so far. However, this invention is not limited to those embodiments and various modifications can be made thereto without departing from the technical scope described in the claims in this application.

This application is based upon and claims the benefit of priority from Japanese Patent Application No. 2010-191657, filed on Aug. 30, 2010, the entire disclosure of which is incorporated herein by reference.

The invention claimed is:

1. A printer for conveying a sheet of a roll paper type to perform printing thereon, the printer comprising a transverse tension sensor for detecting that the sheet being discharged from a discharge port has deviated in a paper width direction orthogonal to a discharging direction, wherein the transverse tension sensor comprises:

a pair of movable pieces, each of which is displaced when the sheet has been displaced to one side and another side in the paper width direction; and a sensor portion for detecting displacement of the pair of movable pieces as a state where the sheet has deviated in the paper width direction, wherein the pair of movable pieces are provided with guide portions, respectively, the guide portions being arranged in rear of the discharge port in the discharging direction so as to sandwich therebetween the sheet in the paper width direction;

wherein the guide portions are biased by bias means inward in the paper width direction so as to have an interval therebetween corresponding to a width dimension of the sheet;

wherein the bias means biases the guide portions with a biasing force larger than a force of discharging the sheet; and wherein conveyance of the sheet is stopped based on a detection signal of the transverse tension sensor.

2. The printer according to claim 1, further comprising a front cover mounted to a front surface of the printer in a removable manner so as to cover an inside of the printer, the front surface having a discharge port formed therein, wherein the pair of movable pieces and the sensor portion are mounted on an inner side of the front cover.

3. The printer according to claim 1, wherein:

the pair of movable pieces are coupled together so as to move in association with each other; and the sensor portion is provided in common to the pair of movable pieces.

4. The printer according to claim 1, wherein:

the pair of movable pieces are coupled together so as to move in association with each other; and the bias means is provided in common to the pair of movable pieces.

5. The printer according to claim 1, wherein the sensor portion comprises any one of an optical sensor, a magnetic sensor, and a mechanical switch.

6. The printer according to claim 1, wherein the bias means comprises any one of a coil spring, a leaf spring, and a weight.

7. The printer according to claim 1, further comprising:

a retreat region for the sheet, which is formed in a thickness direction of the sheet so as to communicate to a sheet conveyance path; and a deflection sensor provided in the retreat region, for detecting the sheet that has entered the retreat region when discharge has been hindered, wherein the conveyance of the sheet is stopped based on the detection signal of the transverse tension sensor or a detection signal of the deflection sensor.

8. The printer according to claim 1, further comprising means for informing, when the conveyance of the sheet has been stopped, a user of the stop of the conveyance of the sheet.

* * * * *